(12) United States Patent
Tunks et al.

(10) Patent No.: US 7,987,024 B2
(45) Date of Patent: Jul. 26, 2011

(54) FAN SPEED CONTROL

(75) Inventors: Eric Tunks, Austin, TX (US); Tyler Duncan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 12/245,288

(22) Filed: Oct. 3, 2008

(65) Prior Publication Data

US 2010/0087965 A1 Apr. 8, 2010

(51) Int. Cl.
*G05D 23/00* (2006.01)
(52) U.S. Cl. ........... 700/299; 318/634; 361/695; 700/28
(58) Field of Classification Search .................. 700/299, 700/300, 28, 89; 318/634
See application file for complete search history.

(56) References Cited

U.S. PATENT DOCUMENTS

| | | | |
|---|---|---|---|
| 5,249,741 A | 10/1993 | Bistline et al. | |
| 5,926,386 A | 7/1999 | Ott et al. | |
| 6,757,592 B1 * | 6/2004 | Henderson et al. | 700/299 |
| 6,965,175 B2 | 11/2005 | Hu et al. | |
| 6,996,441 B1 | 2/2006 | Tobias | |
| 7,219,507 B1 * | 5/2007 | Flachs | 62/186 |
| 2003/0041814 A1 * | 3/2003 | Laird et al. | 123/41.12 |
| 2009/0167228 A1 * | 7/2009 | Chung et al. | 318/455 |

OTHER PUBLICATIONS

Berke, Stuart; Fan Control Optimization Based On Processor TDP Power; U.S. Appl. No. 11/746,143, filed May 9, 2007.

* cited by examiner

*Primary Examiner* — Paul L Rodriguez
*Assistant Examiner* — Nathan Laughlin
(74) *Attorney, Agent, or Firm* — Haynes and Boone, LLP

(57) ABSTRACT

A method for controlling fan speed includes providing a fan that is in fluid communication with at least one heat producing component, detecting a temperature, determining a fan speed using the detected temperature and a nonlinear fan speed function, and applying a control signal to the fan such that the fan operates at the determined fan speed in order to cool the at least one heat producing component.

20 Claims, 18 Drawing Sheets

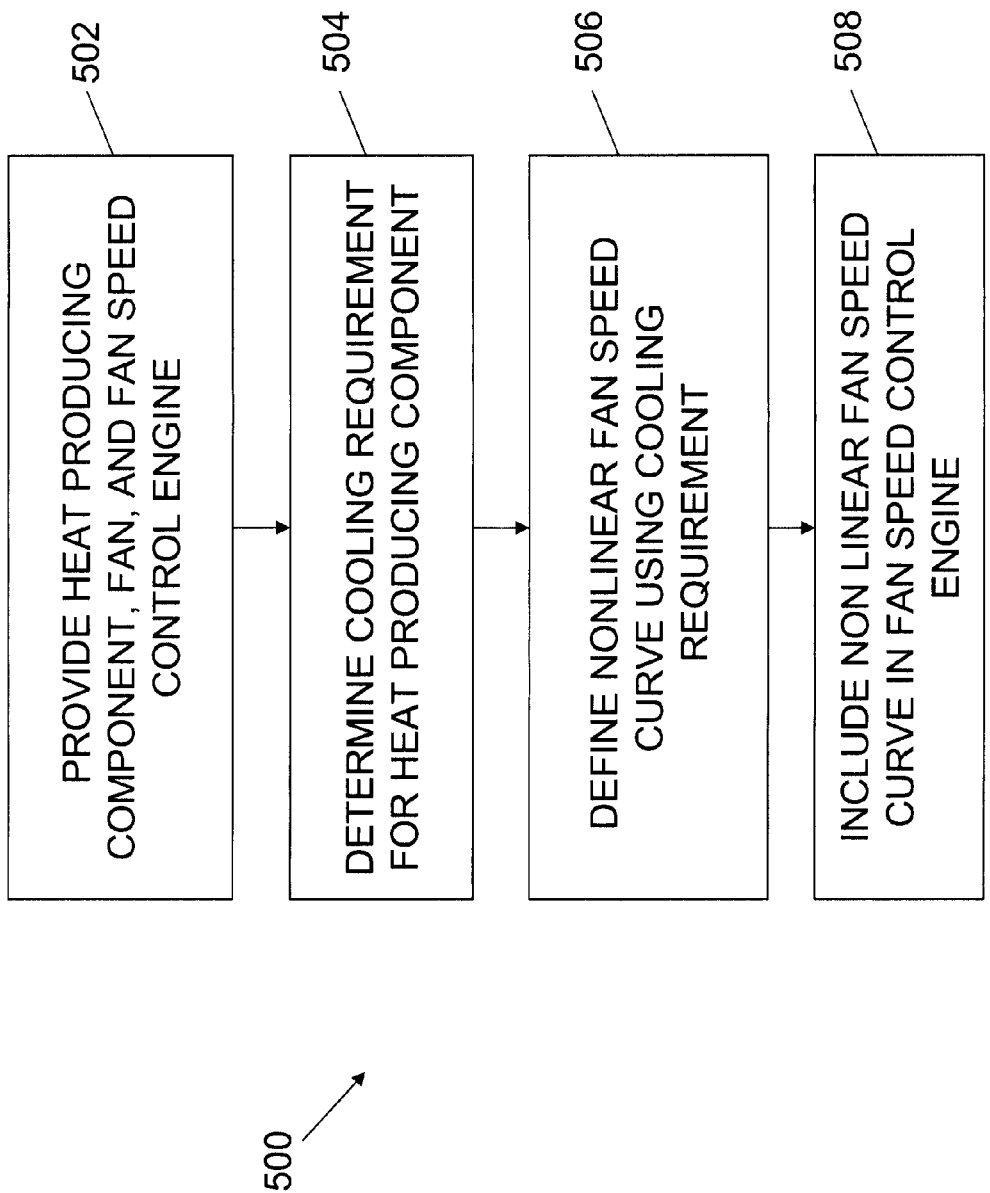

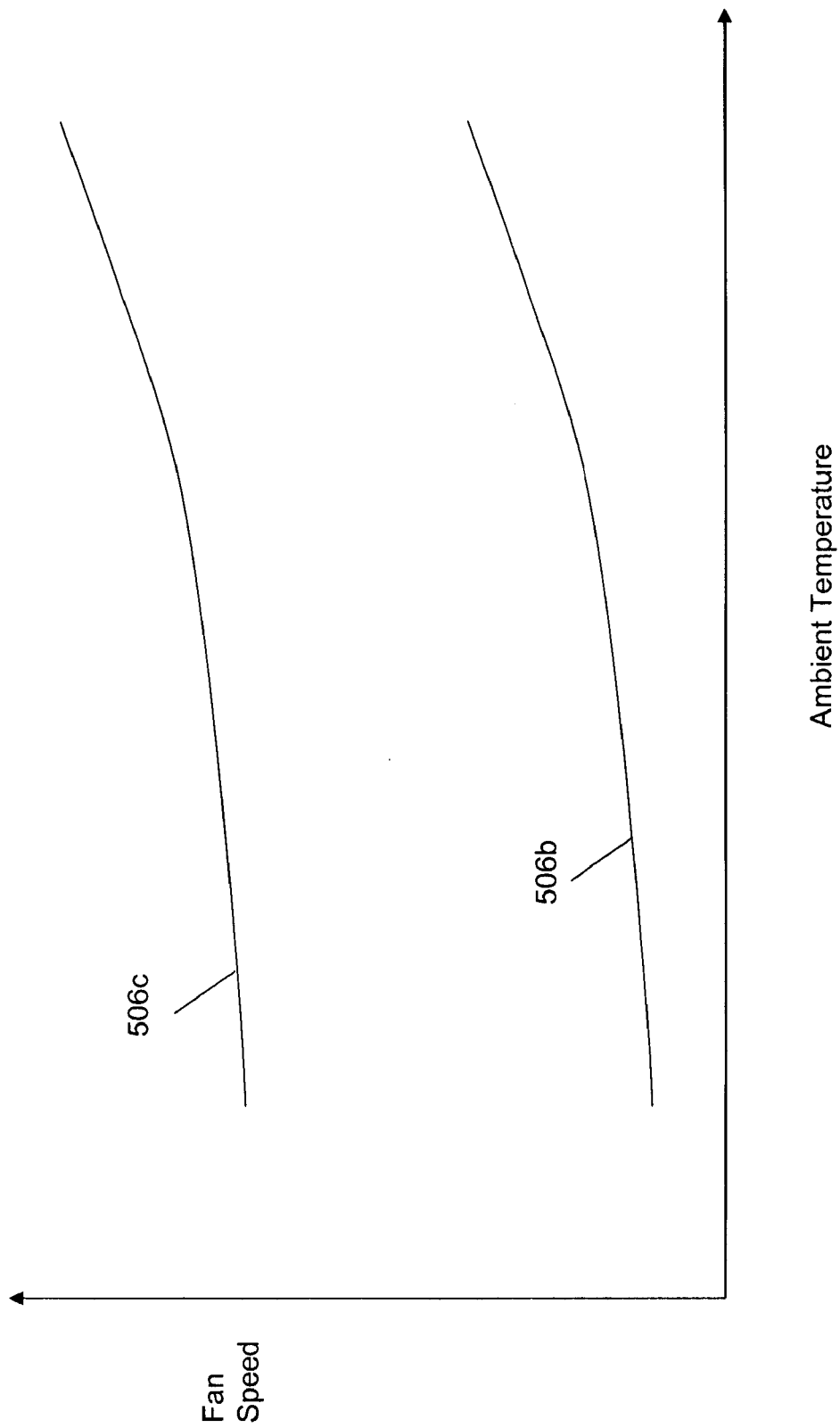

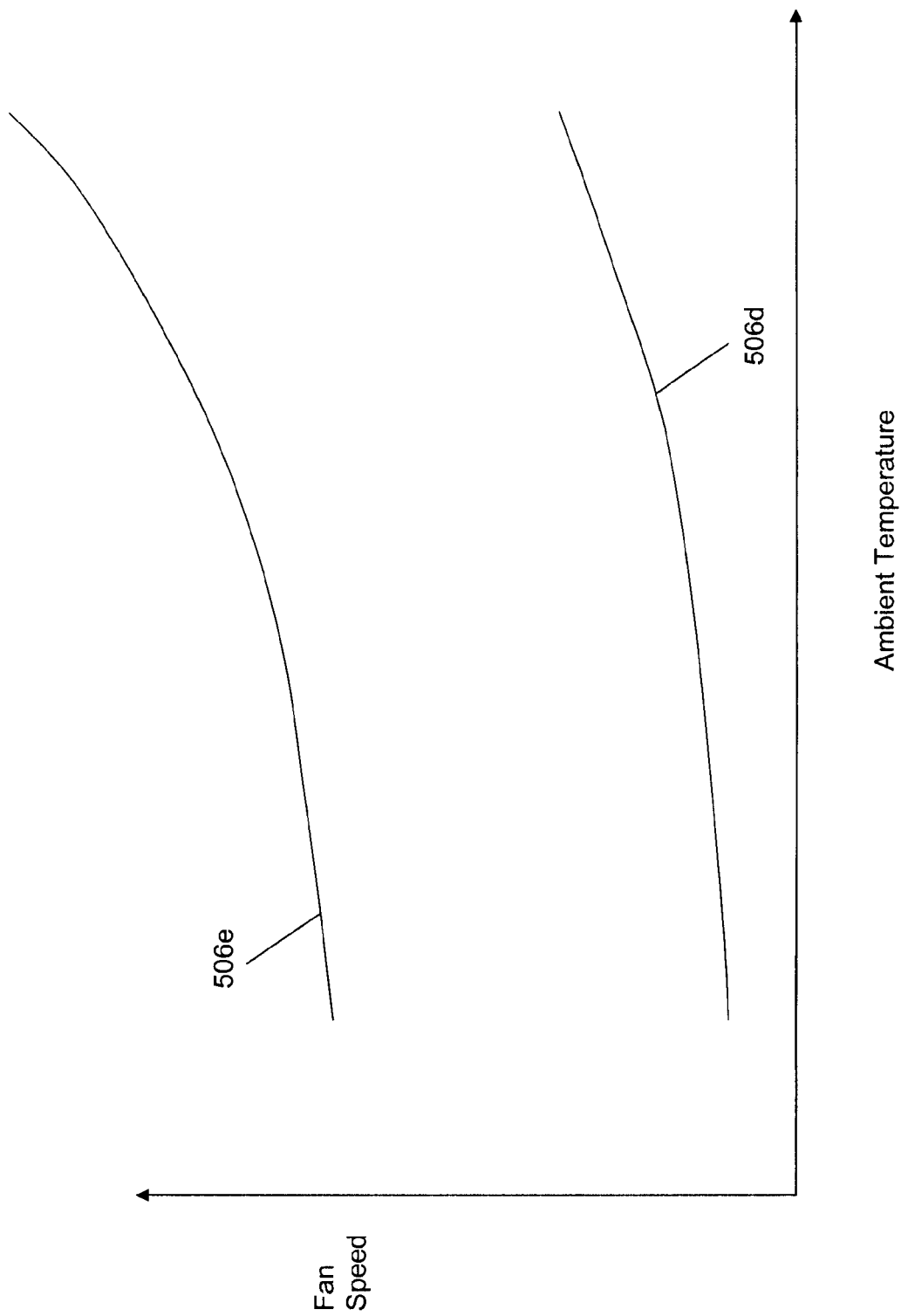

| FAN POWER SAVINGS (Watts) | | | | | | | | | |
|---|---|---|---|---|---|---|---|---|---|
| | 40 W PROCESSORS | | | 80 W PROCESSORS | | | 120 W PROCESSORS | | |
| AMBIENT TEMP | 512MB DRx8 | 2GB DRx4 | 4GB DRx4 | 512MB DRx8 | 2GB DRx4 | 4GB DRx4 | 512MB DRx8 | 2GB DRx4 | 4GB DRx4 |
| 25 | 6 | 27 | 8 | 14 | 14 | 0 | 17 | 15 | 0 |
| 30 | 21 | 50 | 14 | 33 | 35 | 1 | 38 | 34 | 0 |
| 35 | 60 | 106 | 41 | 79 | 88 | 16 | 90 | 84 | 0 |

| FAN POWER SAVINGS (%) | | | | | | | | | |
|---|---|---|---|---|---|---|---|---|---|
| | 40 W PROCESSORS | | | 80 W PROCESSORS | | | 120 W PROCESSORS | | |
| AMBIENT TEMP | 512MB DRx8 | 2GB DRx4 | 4GB DRx4 | 512MB DRx8 | 2GB DRx4 | 4GB DRx4 | 512MB DRx8 | 2GB DRx4 | 4GB DRx4 |
| 25 | 7% | 20% | 6% | 13% | 9% | 0% | 13% | 9% | 0% |
| 30 | 19% | 28% | 8% | 23% | 18% | 0% | 22% | 14% | 0% |
| 35 | 36% | 40% | 15% | 38% | 31% | 5% | 34% | 25% | 0% |

Fig. 6b

FAN SPEED CONTROL

BACKGROUND

The present disclosure relates generally to information handling systems, and more particularly to controlling fan speeds in order to cool an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store and communicate information and may include one or more computer systems, data storage systems and networking systems.

As IHSs have increased in computing power, the cooling requirements of IHSs have increased. In order to meet these cooling requirements, fans are added to IHS chassis to cool its heat producing components. As fans affect component performance, noise levels and power consumption, it is desirable to control the speed of these fans in order to optimize power, thermals and acoustics. However, the control of fan speed in an IHS raises a number of issues.

Fan speeds are typically controlled using a single linear fan speed curve. A typical cooling method involves detecting an ambient temperature and using that temperature to identify a fan speed on the linear fan speed curve that will move an appropriate volume of air through the IHS chassis to cool the components. However, the actual heat output of a component or a group of components in the IHS chassis may not be linear, and can vary significantly based on the configuration of the IHS. Accordingly, a linear fan speed curve is often not well matched to the heat output of the IHS, resulting in non-optimal cooling of the IHS. This may lead to poor performance, failure of various components, excessive power consumption, excessive noise generation, and may decrease the lifespan of the fan.

Accordingly, it would be desirable to provide an improved fan speed control.

SUMMARY

According to one embodiment, a method for fan speed control includes providing a fan that is in fluid communication with at least one heat producing component, detecting a temperature, determining a fan speed using the detected temperature and a nonlinear fan speed function, and applying a control signal to the fan such that the fan operates at the determined fan speed in order to cool the heat producing component.

BRIEF DESCRIPTION OF THE DRAWINGS

FIG. 5a is a flowchart illustrating an embodiment of a method for controlling fan speed.

FIG. 5b is a graph illustrating an embodiment of a nonlinear fan speed curve determined using the method of FIG. 5a.

FIG. 5c is a graph illustrating an embodiment of a plurality of nonlinear fan speed curves determined using the method of FIG. 5a.

FIG. 5d is a graph illustrating an embodiment of a plurality of nonlinear fan speed curves determined using the method of FIG. 5a.

FIG. 5e is a graph illustrating an embodiment of a plurality of nonlinear fan speed curves determined using the method of FIG. 5a.

FIG. 6b is a chart illustrating an experimental embodiment using the method of FIG. 6a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
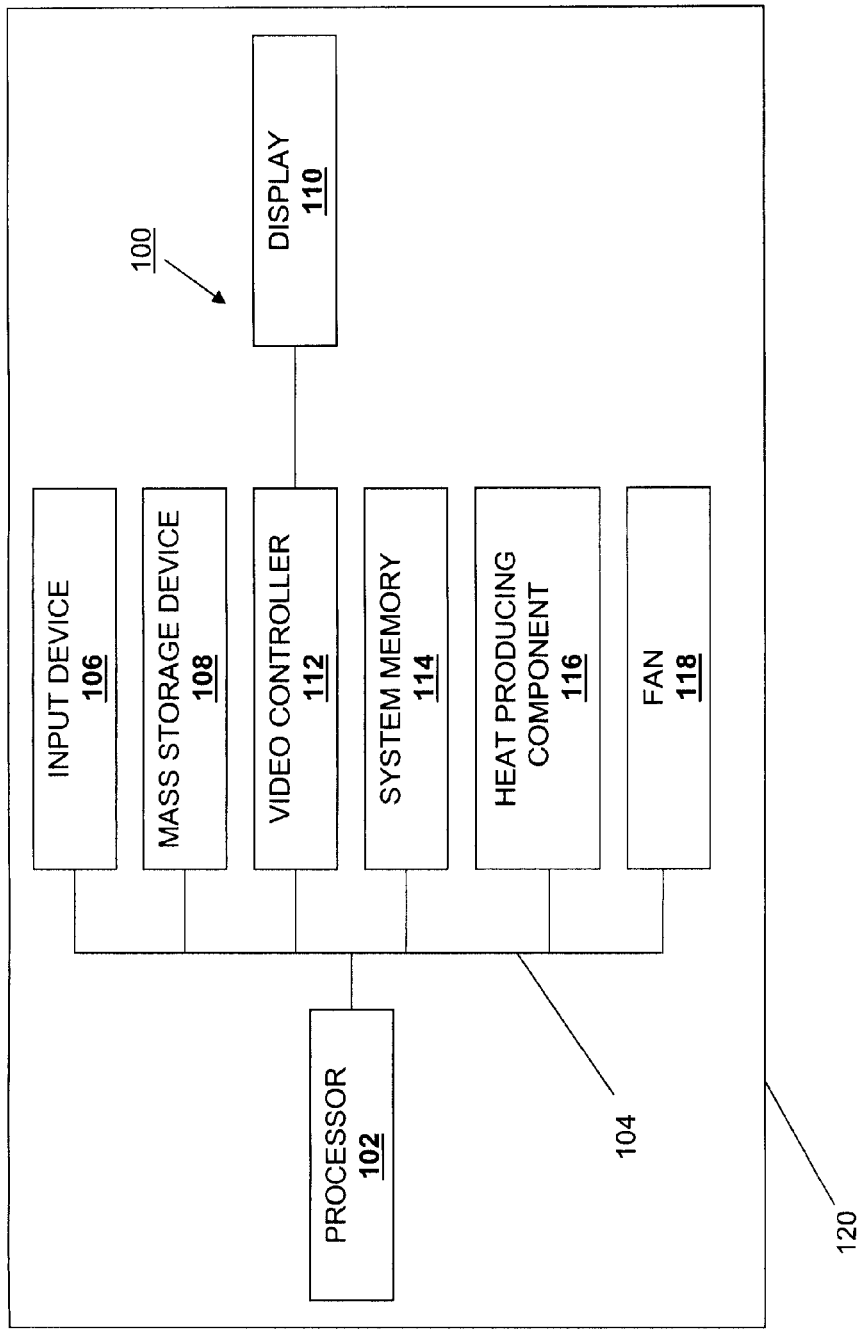
FIG. 1 is a schematic view illustrating an embodiment of an IHS.

In one embodiment, IHS 100, FIG. 1a, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. A heat producing component 116 is coupled to processor 102. Examples of heat producing components include processors (such as, for example, the processor 102), memory devices (such as, for example, the system memory 114), power supplies, and/or a variety of other heat producing components known in the art. A fan 118 is coupled to processor 102 to cool the heat producing components of IHS 100. In an embodiment, a chassis 120 houses some or all of the components of IHS 100. It should be understood that other buses and intermediate circuits can be deployed between the components described above and processor 102 to facilitate interconnection between the components and the processor 102.

Figure 2:
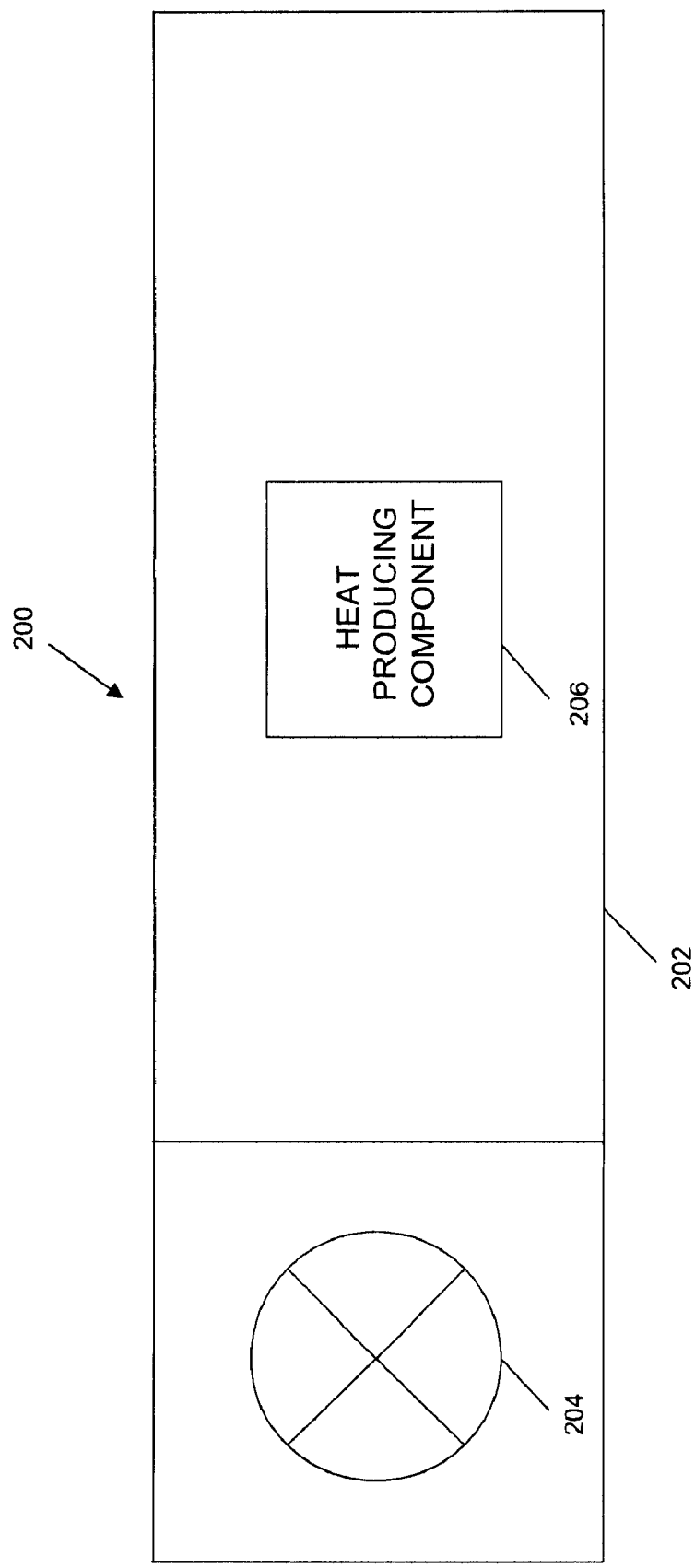
FIG. 2 is a schematic view illustrating an embodiment of an IHS including a chassis housing, a fan, and a heat producing component.

Referring now to FIG. 2, an embodiment of an IHS 200 is illustrated. In an embodiment, the IHS 200 is part of the IHS 100, described above with reference to FIG. 1. The IHS 200 includes an IHS chassis 202 that houses a fan 204 and heat producing component 206. The fan 204 is in fluid communication with the heat producing component 206 such that fluid (e.g., air) that is moved by the fan 204 flows adjacent the heat producing component 206. The IHS 200 may have a plurality of configurations such as, for example, with the heat producing component 206 positioned in different locations in or on the chassis 202, with the heat producing component 206 operating in a low power configuration or a high power configuration, and/or a variety of other configuration options known in the art. In an embodiment, the fan 204 includes at least one connector pin (not illustrated) for receiving a control signal from, for example, the processor 102, described above with reference to FIG. 1, or from an IHS component that is coupled to the processor 102. In an embodiment, the fan 204 is controlled using a pulse width modulation signal. However, the present disclosure is not so limited, and one of skill in the art will recognize the variety of methods that may be used to control the fan 204.

Figure 3:
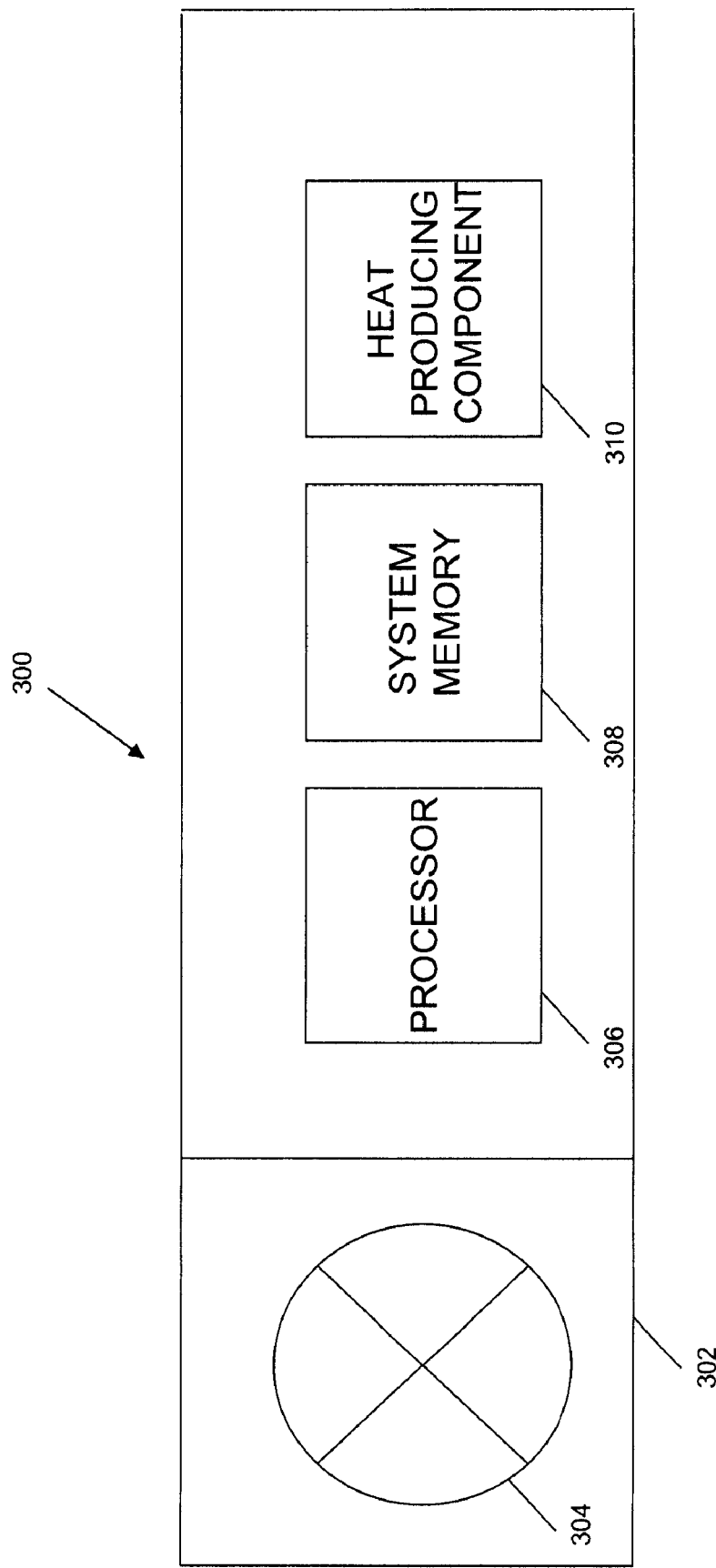
FIG. 3 is a schematic view illustrating an embodiment of an IHS comprising a chassis housing, a fan, a processor, a system memory and a heat producing component.

Referring now to FIG. 3, an embodiment of an IHS 300 is illustrated. In an embodiment, the IHS 300 is part of the IHS 100, described above with reference to FIG. 1. The IHS 300 includes a chassis 302 that houses a fan 304, a processor 306, a system memory 308 and a heat producing component 310. The fan 304 is in fluid communication with the processor 306, the system memory 308, and the heat producing component 310 such that fluid that is moved by the fan 304 flows adjacent the processor 306, the system memory 308 and the heat producing component 310. The IHS 300 may have a plurality of configurations such as, for example, with the processor 306, the system memory 308, and the heat producing component 310 positioned in different locations in or on the chassis 302, with the processor 306, the system memory 308, and/or the heat producing component 310 operating in low power configurations or high power configurations, and/or a variety of other configuration options known in the art. In an embodiment, the fan 304 includes at least one connector pin (not illustrated) for receiving a control signal from, for example, the processor 406 or an IHS component that is coupled to the processor 406. In an embodiment, the fan 404 is controlled using a pulse width modulation signal. However, the present disclosure is not so limited, and one of skill in the art will recognize the variety of methods which may be used to control the fan 304. While the fans 204 and 304 in FIGS. 2 and 3 have been illustrated and described as being positioned in the IHS chassis 202 and 302, respectively, the present disclosure is not so limited. The fan may be positioned outside of the chassis, as may be the case when the heat producing component or components are housed in a chassis (e.g., a blade chassis) that is then coupled to another chassis that houses the fan.

Referring now to FIGS. 1, 2, 3 and 4, an embodiment of an IHS 400 is illustrated. In an embodiment, the IHS 400 may be part of the IHSs 100, 200 and/or 300. The IHS 400 includes a fan speed control engine 402 that may be, for example, software located on a computer-readable medium of the IHS 100, 200, 300 and/or 400. A fan 404, which may be the fans 118, 204 and/or 304, is coupled to the fan speed control engine 402 and is in fluid communication with a heat producing component 406, which may be the heat producing components 116, 206, 310, the processor 306, and/or the system memory 308. The heat producing component 406 may or may not be coupled to the fan speed control engine 402. A temperature sensor 408 is coupled to the fan speed control engine 402. In an embodiment, the temperature sensor 408 may include, for example, a standalone sensor located in an IHS chassis (such as, for example, the IHS chassis 202 and/or 302), a sensor coupled to the heat producing component 406, and/or combinations thereof. In an embodiment, the fan speed control engine 402 is operable to provide a control signal to the fan 404 in order to control a fan speed of the fan 404 using a nonlinear fan speed curve, described below, and a detected temperature that may be received from the temperature sensor 408, the heat producing component 406, combinations thereof, and/or a variety of other sources known in the art.

Figure 4:
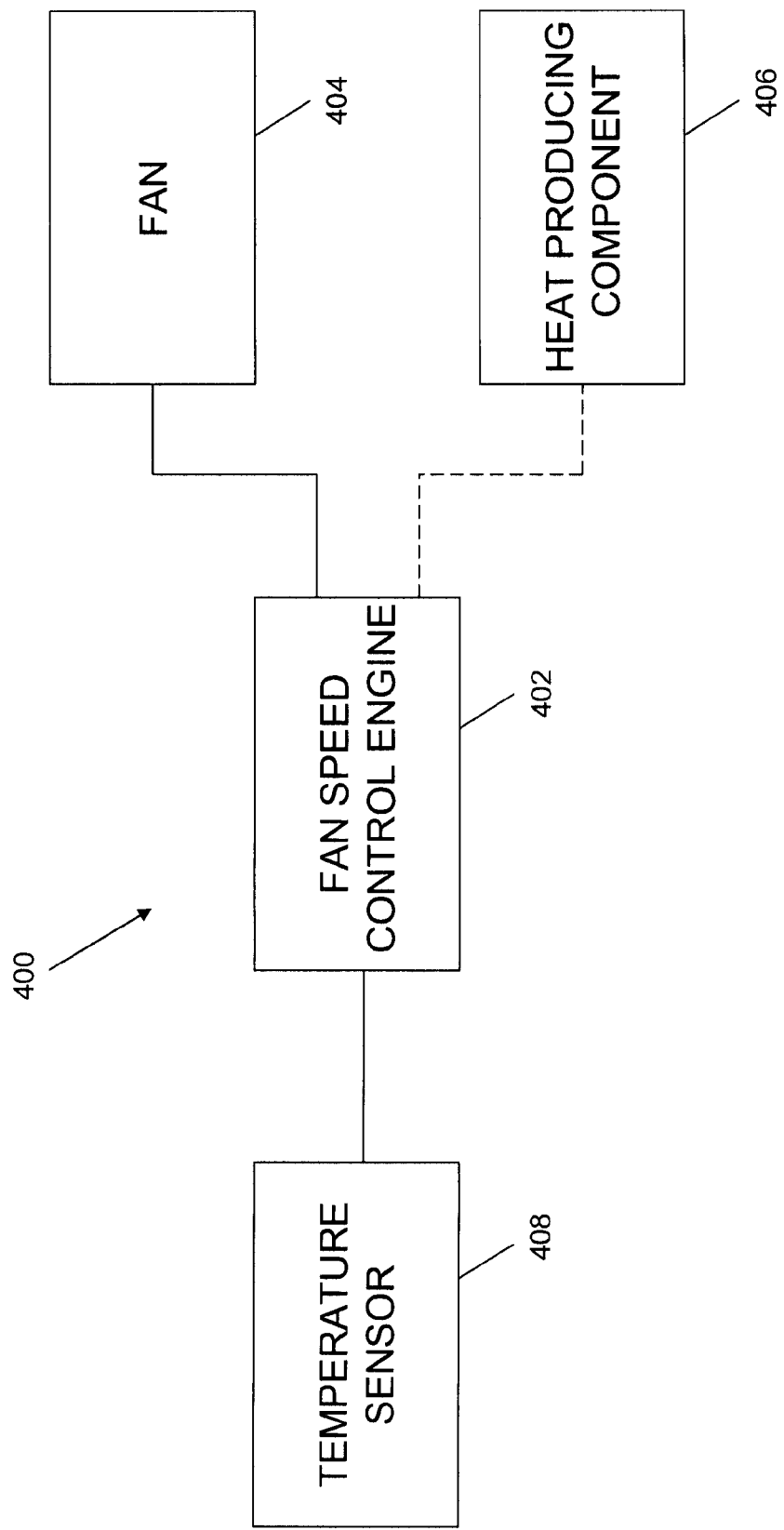
FIG. 4 is a schematic view illustrating an embodiment of an IHS comprising a fan, a heat producing component, a fan speed control engine and a temperature sensor.

Referring now to FIGS. 4 and 5, a method 500 for controlling fan speed is illustrated. The method 500 begins at block 502 where the heat producing component 406, the fan 404, and the fan speed control engine 402 that is coupled to the fan are provided. In an embodiment, the fan speed control engine 402 may also be coupled to the heat producing component 406, as illustrated in FIG. 4. The method 500 then proceeds to block 504 where at least one cooling requirement of the heat producing component 406 is determined. In an embodiment, a cooling requirement of heat producing component includes a volume of airflow that must be moved past the heat producing component in order to keep that heat producing component at a desired temperature for a given operating condition such as, for example, an ambient temperature, a component operating speed, a component operating frequency, and/or a variety of other operating conditions known in the art. For example, a plurality of cooling requirements for a heat producing component may be determined by measuring the temperature of that heat producing component at a set ambient temperature and a plurality of different fan speeds. However, one of skill in the art will recognize the variety of methods that may be used to determine a components cooling requirements. In an embodiment, the cooling requirement of the heat producing component is determined using thermal chamber temperature testing, and the heat producing component may be tested alone or with other components that make up an IHSs configuration. In an embodiment, the heat producing component may be tested in multiple configurations (e.g., with the heat producing component and/or other components positioned at different locations in the IHS chassis, with the heat producing component and/or other components operating in different modes such as, for example, a low power mode and a high power mode, and/or in a variety of other configurations known in the art), with different cooling requirements determined for each configuration.

The method 500 then proceeds to block 506 where at least one nonlinear fan speed curve is defined using the cooling requirement or requirements determined for the heat producing component 406. In an embodiment, the cooling requirement or requirements may be used to determine coefficients that define the slope of one or more nonlinear fan speed curves. For example, a nonlinear fan speed curve may be of the following form:

$$\text{Fan Speed} = Ax^3 + Bx^2 + Cx + D$$

Where A, B, C and D are the coefficients that are determined using the cooling requirements determined in block 504 of the method 500, and x is a temperature that is detected using, for example, the temperature sensor 408. In an embodiment, the coefficients may be determined by curve fitting data obtained through thermal chamber temperature testing of the IHS 400 using methods known in the art. In an experimental embodiment, an IHS with 120 watt processors and four 8 gigabyte Dual Inline Memory Modules was thermal chamber temperature tested and the following fan speed curve was defined:

$$\text{Fan Speed} = 0.1x^3 + 0.2x^2 + 0.84x - 10$$

In another experimental embodiment, an IHS with 65 watt processors and eight 1 gigabyte Dual Inline Memory Modules was thermal chamber temperature tested and the following fan speed curve was defined:

$$\text{Fan Speed} = 0.05x^3 + 0.1x^2 + 0.5x + 1$$

However, the equations above have been described merely as examples, and one of skill in the art will recognize the variety of equations that may be used to determine a fan speed curve.

Figure 5B:
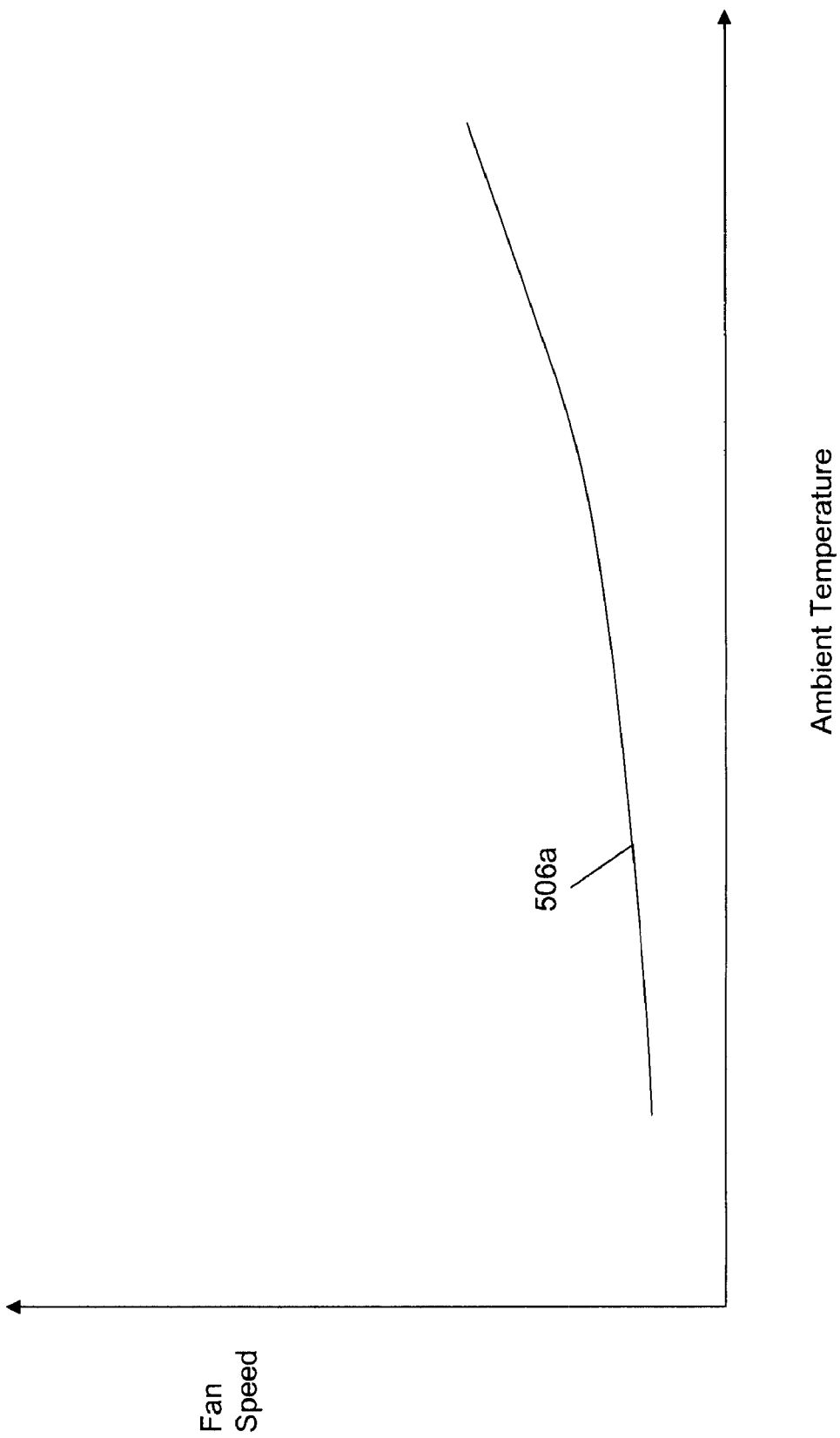

Referring now to FIGS. 5a, 5b, 5c, 5d and 5e, a plurality of nonlinear fan speed functions defined using the method 500 are illustrated. FIG. 5b illustrates a nonlinear fan speed function 506a that may be used to provide the fan speed for a fan or a plurality of fans in an IHS across a range of ambient temperatures. The illustrated embodiment may, for example, provide the fan speed for a specific configuration of a heat producing component in the IHS, a plurality of heat producing components in the IHS, and multiple configurations of one or more heat producing component in the IHS. In an embodiment, the nonlinear fan speed function 506a may be used to provide the fan speed of the fan 204 for the heat producing component 206 in the IHS chassis 202, or to provide the fan speed of the fan 304 for the processor 306, system memory 308, and the heat producing component 310 in the IHS chassis 302, and/or to provide the fans speed in a variety of other IHSs known in the art.

FIG. 5c illustrates a plurality of nonlinear fan speed functions 506b and 506c that may be used to provide the fan speed for a fan or a plurality of fans in an IHS across a range of ambient temperatures. In an embodiment, the nonlinear fan speed functions 506b and 506c may provide the fan speeds for a fan in the IHS for two different configurations of a heat producing component across a range of ambient temperatures (e.g., the fan speed function 506b may provide the fan speed for the fan with the heat producing component in a first configuration in the IHS chassis, and the fan speed function 506c may provide the fan speed for the fan with the heat producing component in a second configuration in the IHS chassis). In the illustrated embodiment, the nonlinear fan speed function 506b and the nonlinear fan speed function 506c have identical or substantially similar slopes due to, for example, the cooling requirements of the heat producing component varying with respect to temperature in substantially the same manner in each of the first and second configurations.

FIG. 5d illustrates a plurality of nonlinear fan speed curves 506d and 506e that may be used to provide the fan speed for a fan or a plurality of fans in an IHS across a range of ambient temperatures. In an embodiment, the nonlinear fan speed curves 506d and 506e may provide the fan speeds for a fan in the IHS for two different configurations of a heat producing component across a range of ambient temperatures (e.g., the fan speed curve 506d may provide the fan speed for the fan with the heat producing component in a first configuration in the IHS chassis, and the fan speed curve 506e may provide the fan speed for the fan with the heat producing component in a second configuration in the IHS chassis). In the illustrated embodiment, the nonlinear fan speed curve 506d and the nonlinear fan speed curve 506e have different slopes due to, for example, the cooling requirements of the heat producing component varying with respect to temperature differently in each of the first and second configurations.

Figure 5E:
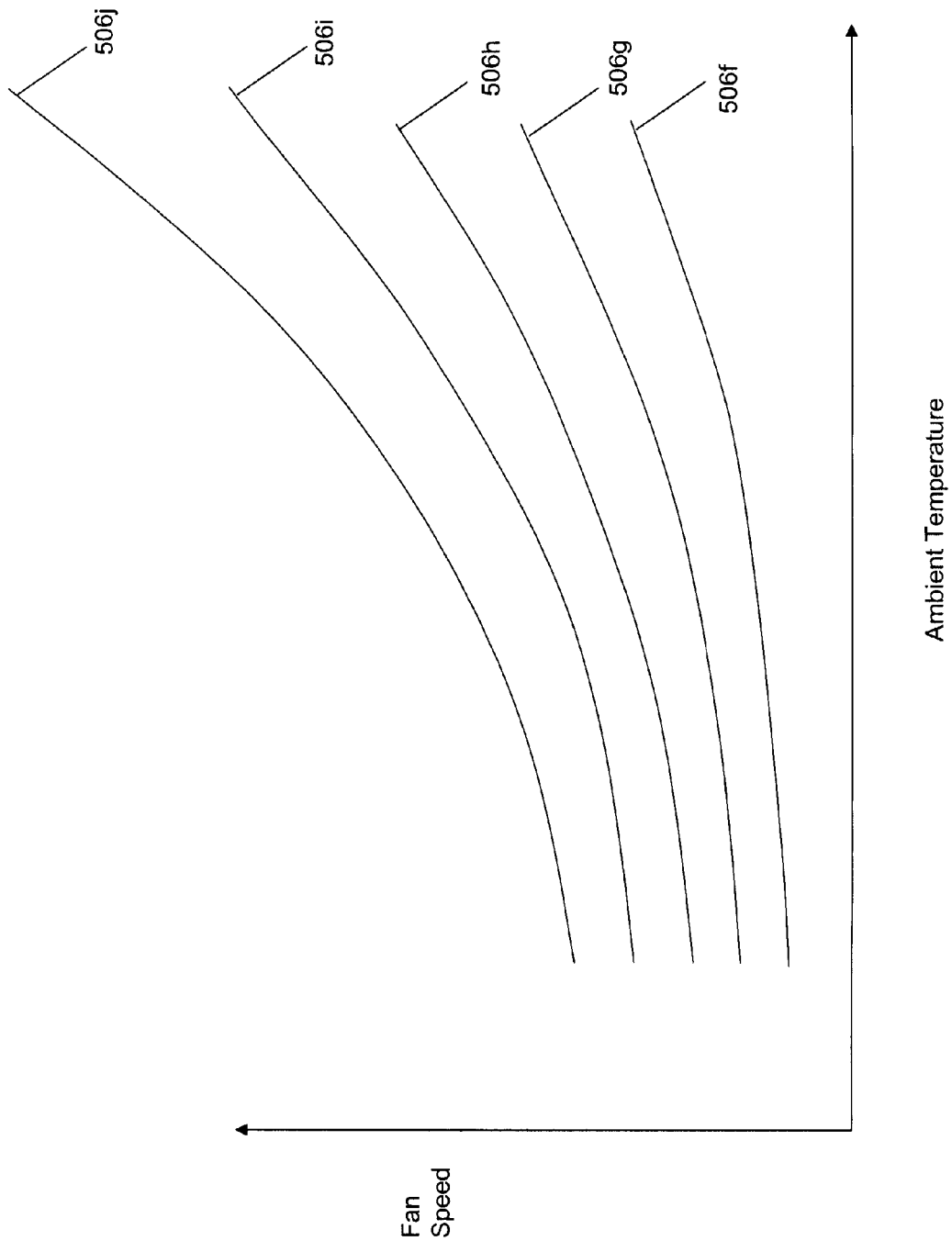

FIG. 5e illustrates a plurality of nonlinear fan speed curves 506f, 506g, 506h, 506i and 506j that may be used to provide the fan speed for a fan or a plurality of fans in an IHS across a range of ambient temperatures. In an embodiment, the nonlinear fan speed curves 506f-506j may provide the fan speeds for a fan 204 in the IHS for a plurality of different configurations of a heat producing component across a range of ambient temperatures (e.g., the fan speed curve 506f may provide the fan speed for the fan with the heat producing component in a first configuration in the IHS chassis, the fan speed curve 506g may provide the fan speed for the fan with the heat producing component in a second configuration in the IHS chassis, the fan speed curve 506h may provide the fan speed for the fan with the heat producing component in a third configuration in the IHS chassis, and so on). In the illustrated embodiment, the nonlinear fan speed curves 506f-506j have different slopes due to, for example, the cooling requirements of the heat producing component varying with respect to temperature differently in each of the configurations. In an embodiment, the slopes of each of the fan speed curves may be identical or substantially similar due to the cooling requirements of the heat producing component varying with respect to temperature in substantially the same manner in each of the configurations.

Figure 5F:
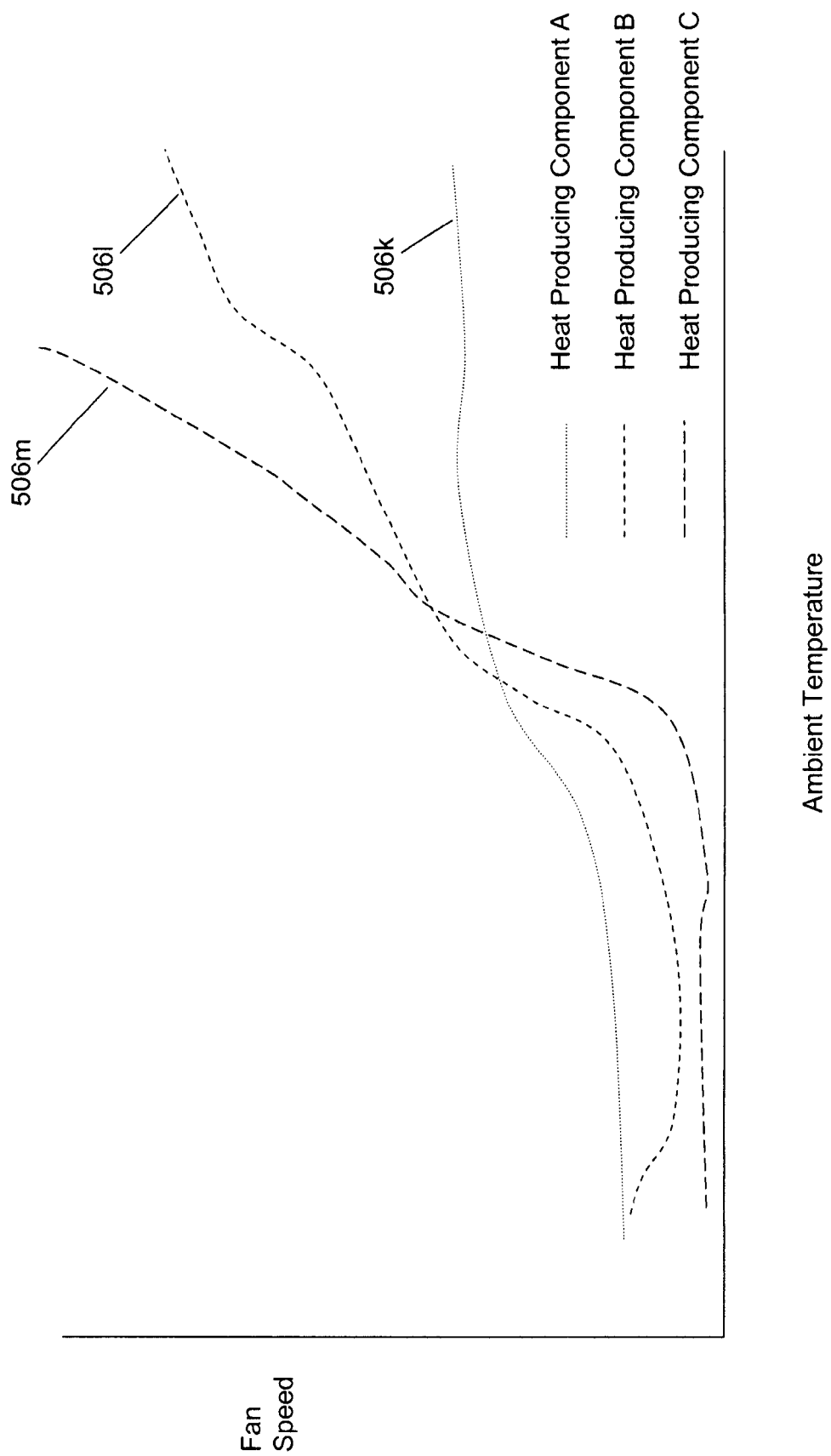
FIG. 5f is a graph illustrating an embodiment of a plurality of nonlinear fan speed curves for a plurality of different components of the IHS of FIG. 4.

FIG. 5f illustrates a plurality of nonlinear fan speed functions 506k, 506l and 506m that may be used to provide the fan speed for a fan or a plurality of fans in an IHS across a range of ambient temperatures. In an embodiment, the nonlinear fan speed functions 506k, 506l and 506m may provide the fan speeds for a fan in the IHS for a plurality of different heat producing components A, B and C, respectively, across a range of ambient temperatures (e.g., the IHS may be the IHS 300, described with reference to FIG. 3, with the processor 306 as heat producing component A, the system memory 308 as heat producing component B, and the heat producing component 310 as heat producing component C). In the illustrated embodiment, the nonlinear fan speed functions 506k, 506l and 506m have different slopes due to, for example, the cooling requirements of each of the heat producing components varying with respect to temperature differently.

The method 500 then proceeds to block 508 where the nonlinear fan speed curve is included in the fan speed control engine 402. In an embodiment, the fan speed control engine 402 includes software located on a computer-readable medium in the IHS and is operable to store the nonlinear fan speed curve as part of computer executable instructions that are used by the fan speed control engine 402 to control the speed of the fan 404. As describe in further detail below, a temperature may be detected by the temperature sensor 408 and used by the fan speed control engine 402 to control the fan 404 by determining a fan speed on the nonlinear speed curve that corresponds to that detected temperature. As also described in further detail below, a nonlinear fan speed curve may be selected from a plurality of nonlinear fan speed curves by the fan speed control engine 402 based on, for example, the configuration of the IHS 400, and a temperature may be detected by the temperature sensor 408 and used by the fan speed control engine 402 to control the fan 404 by determining a fan speed on the nonlinear speed curve that corresponds to that detected temperature.

Figure 6A:
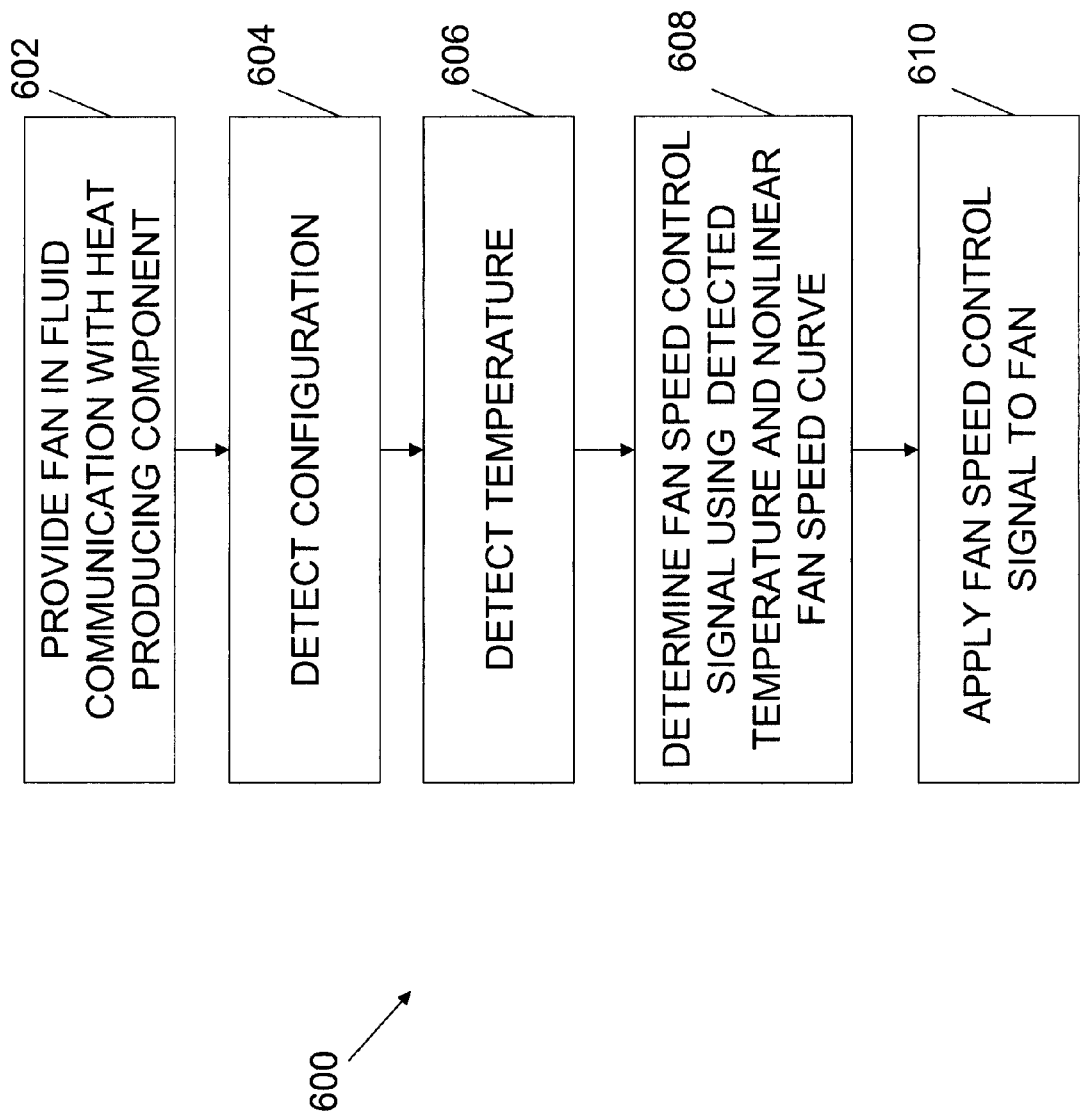
FIG. 6a is a flowchart illustrating an embodiment of a method for controlling fan speed.

Referring now to FIGS. 4 and 6a, a method 600 for controlling fan speed is illustrated. While the method 600 may be performed using the IHSs 100, 200, 300 and/or 400, the method 600 will be described mainly using the IHS 400. The method 600 begins at block 602 where the fan 404 that is in fluid communication with the heat producing component 406 is provided. The method 600 then proceeds to block 604 where a configuration of the IHS 400 is detected. In an embodiment, the configuration of the IHS 400 may include parameters such as, for example, the size and shape of the IHS chassis, the positioning of components in the IHS chassis, the type of components in the IHS, the operating parameters of components in the IHS, and/or a variety of other configuration factors known in the art. The method 600 then proceeds to block 606 where a temperature is detected by the temperature sensor 408. In an embodiment, the detected temperature may be an ambient temperature, a component temperature, combinations thereof, and/or a variety of other temperatures known in the art.

The method 600 then proceeds to block 608 where a fan speed is determined using the detected temperature and a nonlinear fan speed curve. In an embodiment, the nonlinear fan speed curve was determined using the method 700 and depends, for example, on the configuration of the IHS 400 detected in block 604 of the method 600. In an embodiment, the nonlinear fan speed curve may also be at least partially defined by feedback (e.g., temperature data, performance data, etc.) from the heat producing component 406 and/or other components of the IHS 400. In an embodiment, the nonlinear fan speed curve 506a of FIG. 5b may be associated with the fan 404, and the fan speed of the fan 404 may be determined by using the detected temperature to determine the appropriate fan speed on the nonlinear fan speed curve 506a. In another embodiment, the nonlinear fan speed curves 506b and 506c of FIG. 5c may be associated with the fan 404, and the fan speed of the fan 404 may be determined by using the detected configuration to select which of the nonlinear fan speed curves 506b and 506c to use, and then using the detected temperature to determine the appropriate fan speed on the selected nonlinear fan speed curve. In yet another embodiment, the nonlinear fan speed curves 506d and 506e of FIG. 5d may be associated with the fan 404, and the fan speed of the fan 404 may be determined by using the detected configuration to select which of the nonlinear fan speed curves 506d and 506e to use, and then using the detected temperature to determine the appropriate fan speed on the selected nonlinear fan speed curve. In yet another embodiment, the nonlinear fan speed curves 506f, 506g, 506h, 506i and 506j of FIG. 5e may be associated with the fan 404, and the fan speed of the fan 404 may be determined by using the detected configuration to select which of the nonlinear fan speed curves 506f, 506g, 506h, 506i and 506j to use, and then using the detected temperature to determine the appropriate fan speed on the selected nonlinear fan speed curve. In yet another embodiment, the nonlinear fan speed curves 506k, 506l and 506m of FIG. 5f may be associated with the fan 404, and the fan speed of the fan 404 may be determined using the detected temperature to determine which of the nonlinear fan speed curves 506k, 506l and 506m returns the greatest fan speed relative to the other nonlinear fan speed curves. The method 600 then proceeds to block 610, where a control signal is applied to the fan 404 by the fan speed control engine 402 such that the fan 404 operates at the determined fan speed in order to cool the heat producing component 406 or components. In an embodiment, the control signal includes a pulse width modulation signal. In an experimental embodiment, using systems similar to those described above, DC fan power savings ranged between 10% to 40% across the supported ambient temperature range, as illustrated in FIG. 6b.

Figure 7:
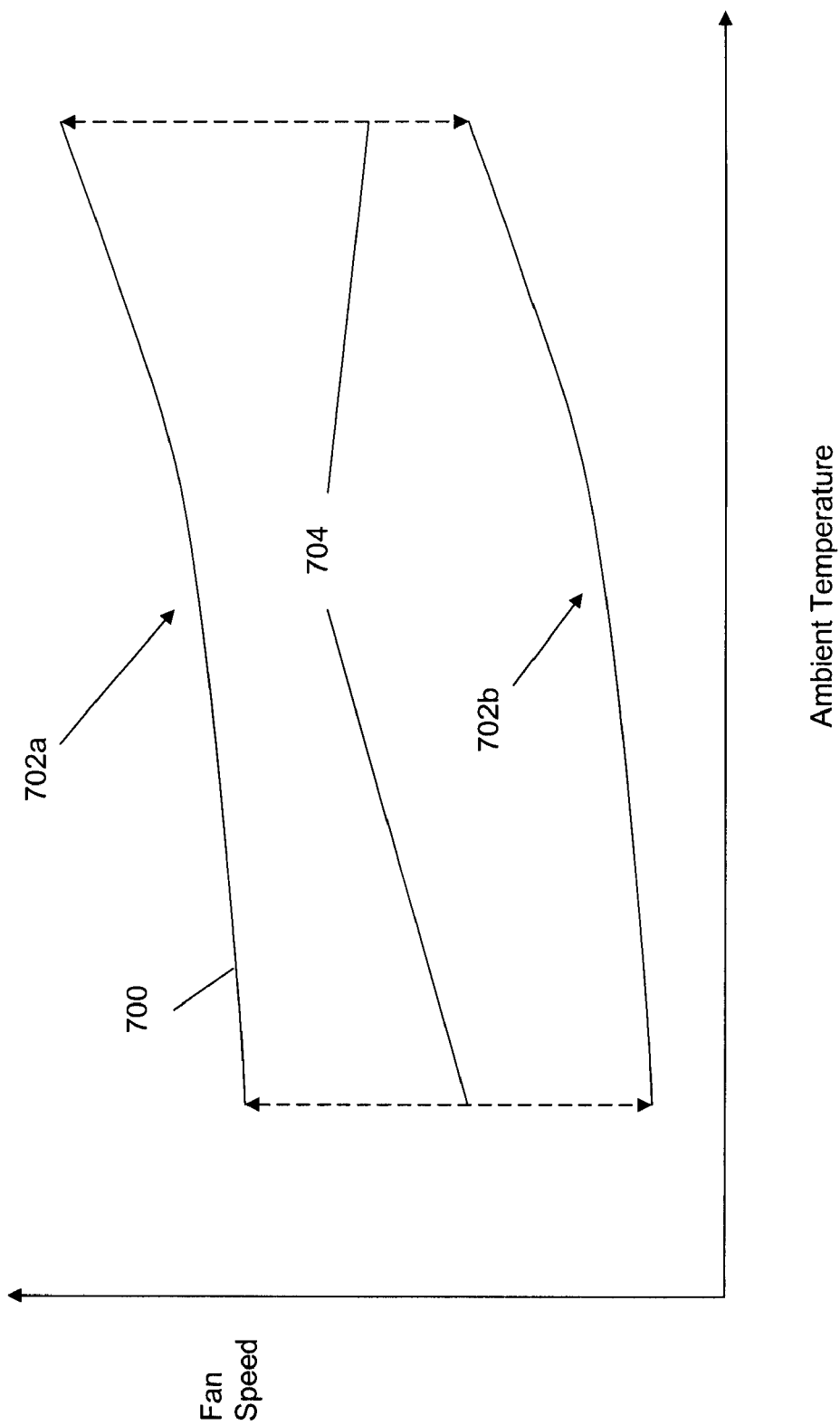
FIG. 7 is a graph illustrating an embodiment of the shifting a fan speed curve.

Referring now to FIG. 7, an embodiment of the shifting of a nonlinear fan speed curve is illustrated using the IHS 200 described above with reference to FIG. 2. In an embodiment, a nonlinear fan speed curve 700 may be associated with the fan 204 in the IHS 200. In an embodiment, the nonlinear fan speed curve 700 may be used to determine the fan speed for the fan 204 for two different configurations of the IHS 200 across a range of ambient temperatures. For example, a first configuration 702a of the IHS 200 may require higher fan speeds according to the nonlinear fan speed curve 700 relative to a second configuration 702b of the IHS 200. However, the cooling requirements of the heat producing component 206 may vary with respect to temperature in substantially the same manner in each of the first configuration 702a and second configuration 702b such that the nonlinear fan speed curve 700 may be used for the fan 204 and shifted based on the detected configuration of the IHS 200, as demonstrated by the shift lines 704 illustrating the nonlinear fan speed curve 700 being used to determine the fan speed in each of the first configuration 702a and the second configuration 702b.

Figure 8:
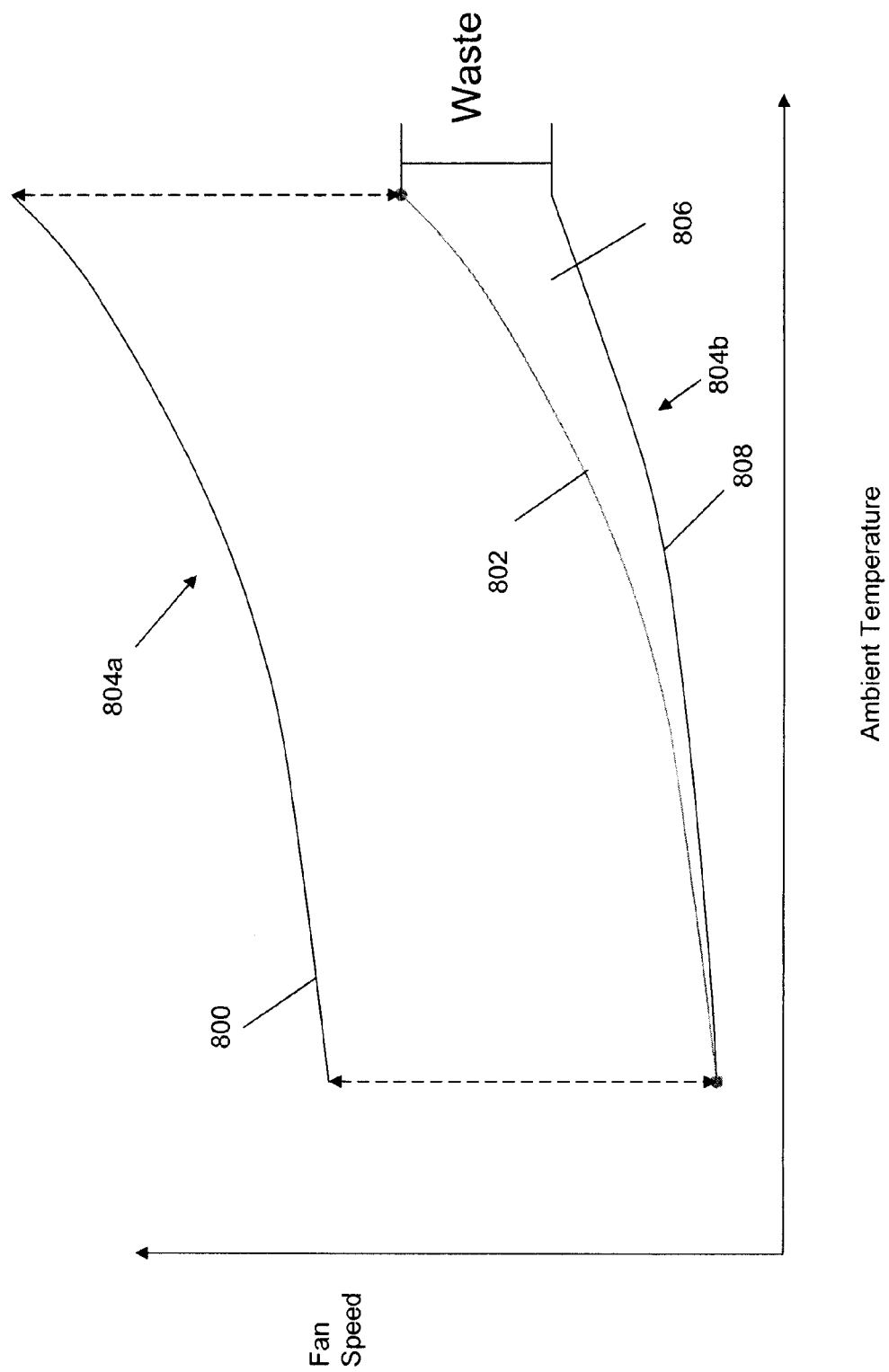
FIG. 8 is a graph illustrating an embodiment of the non-optimal shifting of fan speed curves.

Referring now to FIG. 8, the power savings through the use of nonlinear fan speed curves to cool the IHS 200 is illustrated. In an embodiment, a nonlinear fan speed curve 800 may be associated with the fan 204 in the IHS 200. In an embodiment, the nonlinear fan speed curve 800 may determine the fan speed for the fan 204 for a configuration 804a of the IHS 200 across a range of ambient temperatures. As illustrated in FIG. 8, the configuration 804a of the heat producing component 206 requires higher fan speeds according to the nonlinear fan speed curve 800 relative to a configuration 804b of the IHS 200, and the cooling requirements of the heat producing component 206 in the configuration 804a vary with respect to temperature differently than the cooling requirements of the heat producing component 206 in the second configuration 804b. As such, the shifting of the nonlinear fan speed curve 800 between the configuration 804a and the configuration 804b, as described above with reference to FIG. 7, will result in a fan speed according to a fan speed curve 802 that is inappropriate for the heat producing component 206 in the second configuration 804b, creating the inefficiency 806 illustrated in FIG. 8. However, by using a nonlinear fan speed curve 808 having a different slope relative to the nonlinear fan speed curve 800 to account for the different cooling requirements of heat producing component 206 in the configurations 804a and 804b, the fan speed may be optimized such that problems created due to the inefficiency of simply shifting the nonlinear fan speed curve are remedied.

Figure 9A:
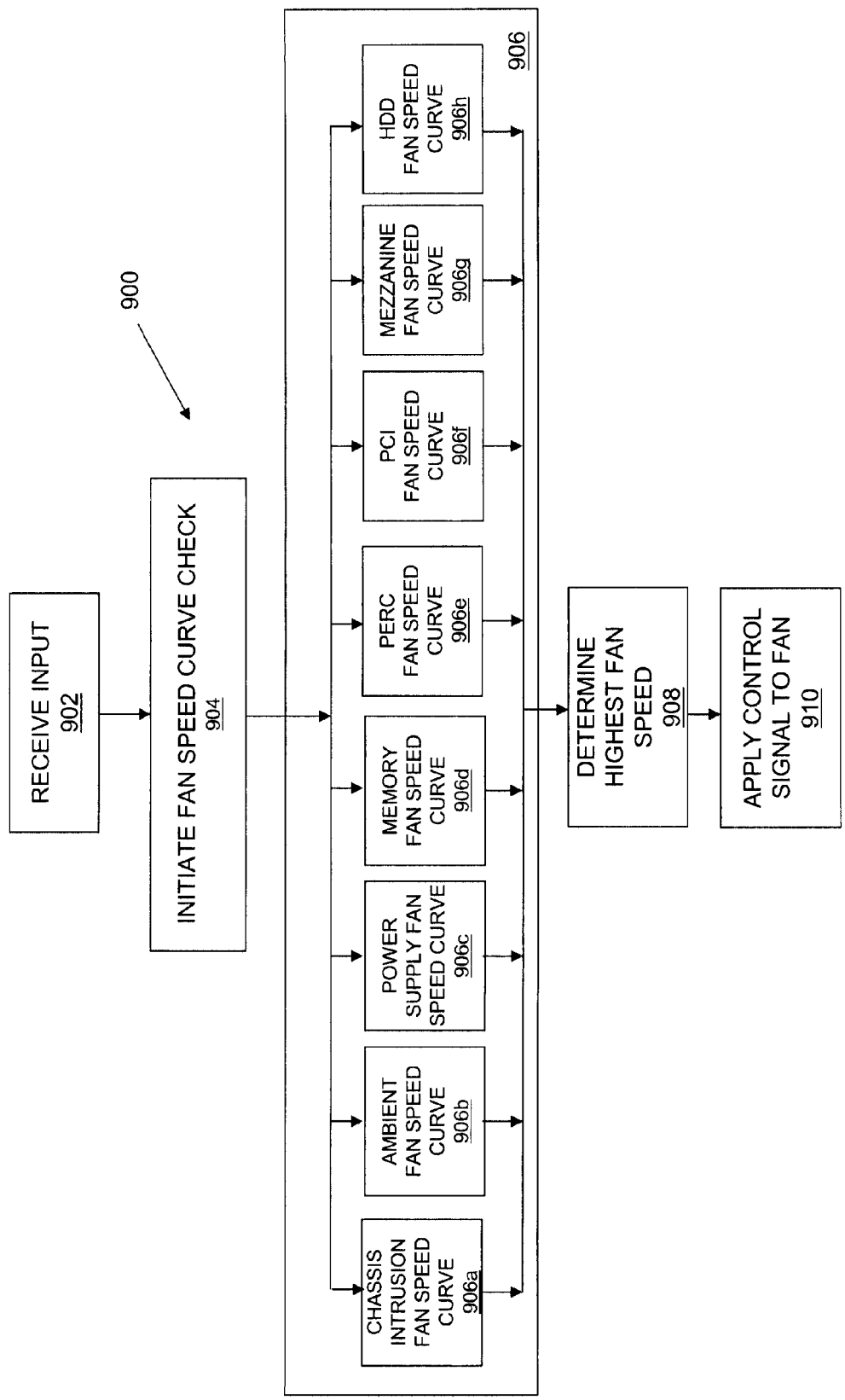
FIG. 9a is a flowchart illustrating an embodiment of a method for controlling fan speed by selecting a component requiring the highest fan speed from amongst a plurality of components in a configuration.
Figure 9B:
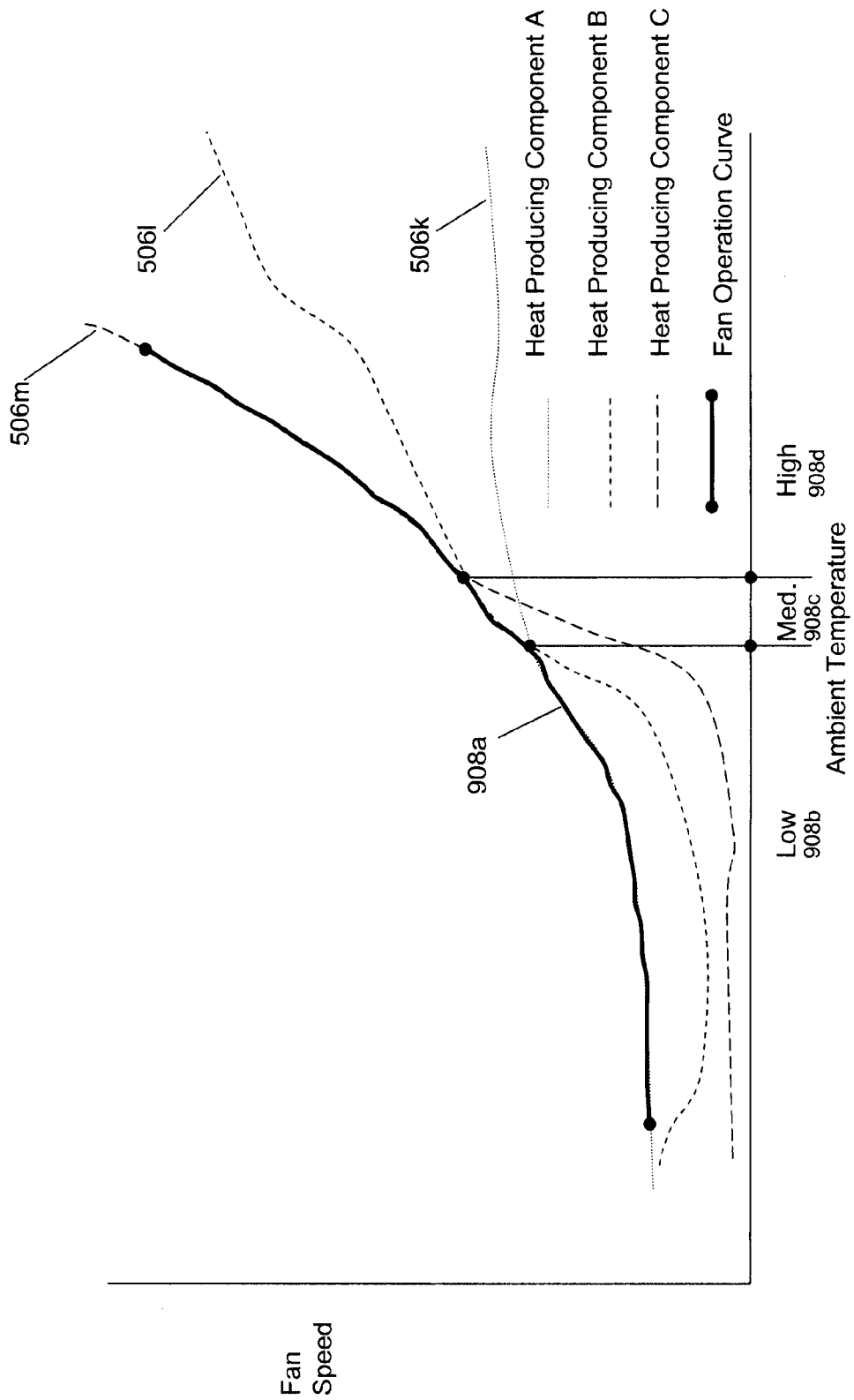
FIG. 9b is a graph illustrating an embodiment of using a plurality of fan speed curves to cool a plurality of components of the IHS of FIG. 4.

Referring now to FIG. 9a and 9b, a method 900 for using a plurality of fan speed curves to cool a plurality of heat producing components is illustrated. In the illustrated embodiment, the method 900 determines a fan speed for a fan by selecting a nonlinear fan speed curve that results in the highest fan speed from amongst a plurality of nonlinear fan speed curves for an IHS configuration. The method 900 begins at block 902, where a input is received. In an embodiment, the input may be, for example, from the temperature sensor 408, described above with reference to FIG. 4, and may include an ambient temperature, a component temperature, combinations thereof, and/or a variety of other inputs known in the art. The method 900 then proceeds to block 904 where a fan speed curve check is initiated. The method 900 then proceeds to block 906 where a plurality of fan speed curves are checked. In an embodiment, a variety of fan speed curves may be checked such as, for example, a chassis intrusion fan speed curve 906a, an ambient fan speed curve 906b, a power supply fan speed curve 906c, a memory fan speed curve 906d, a PowerEdge Expandable RAID Controller (PERC) fan speed curve 906e, a peripheral component interconnect (PCI) fan speed curve 906f, a mezzanine board fan speed curve 906g, and a hard disk drive (HDD) fan speed curve 906h. However, the present disclosure is not limited to these examples and one of skill in the art will recognize the variety of fan speed curves that may be included. In an embodiment, these fan speed curves may vary based on the configuration of components in the IHS.

The method 900 then proceeds to block 908 where a fan speed control engine determines the highest fan speed according to the input received in block 902 and the fan speed curves checked in block 906. In an embodiment, the fan speed curves 506k, 506l and 506m, described above with reference to FIG. 5f, may be used to determine the fan speed for the fan 404, described above with reference to FIG. 4, across a range of ambient temperatures. In an embodiment, the method 900 may be carried out to produce a fan operation curve 908a which uses portions of the nonlinear fan speed curves 506k, 506l and 506m to determine the fans speed for the fan 404. For example, if the sensor input received in block 902 of the method 900 includes a temperature in the lower portion 908b of the temperature range, the fan speed control engine 402 will determine that the fan speed curve 506k results in the greatest fan speed relative to the remainder of the fan speed curves 506l and 506m. As such, the fan speed control engine will select the fan speed curve 506k for the detected temperature to determine the fan speed. However, if the sensor input received in block 902 of the method 900 provides a temperature in the middle portion 908c of the temperature range, similar steps will be followed, and the fan speed curve 506l will be used to determine the fan speed. Furthermore, if the sensor input received in block 902 of the method 900 provides a temperature in the high portion 908d of the temperature range, similar steps will be followed and the fan speed curve 506m will be used to determine the fan speed. This process of fan speed curve selection provides the resultant fan operation curve 908a that is comprised of the highest magnitude fan speed required by any of the components for any given temperature, thus ensuring the minimum required fan speed operation for the components in the IHS 400. The method 900 then proceeds on to block 910 where a control signal is applied to the fan according to the fan speed determined in block 908.

Figure 10:
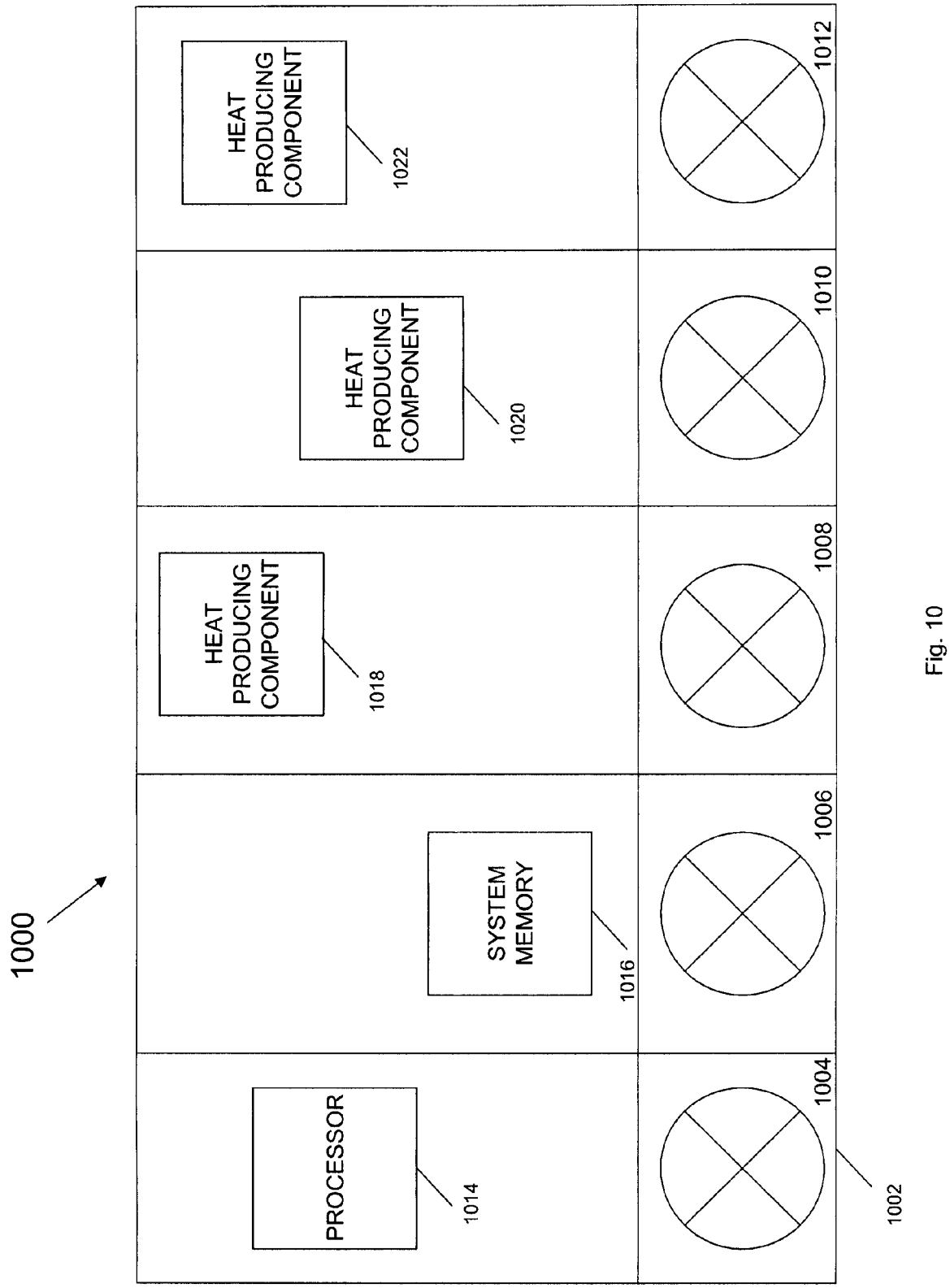
FIG. 10 is a schematic view illustrating an embodiment of an IHS comprising a chassis housing, a processor, a system memory, and a plurality of fans each in fluid communication with a single heat producing component.

Referring now to FIG. 10, an embodiment of the IHS 1000 is illustrated. The IHS 1000 includes a chassis 1002 that houses a plurality of fans 1004-1012, each fan in fluid communication with a respective processor 1014, system memory 1016, and heat producing components 1018-1022, as illustrated in FIG. 10. In an embodiment, the method 500 may be used to determine the nonlinear fan speed functions for each of the fans 1004-1012 in the IHS 1000 based on the cooling requirements of that fan's respective components, and the method 600 may then be used to cool those components, as described above. In the illustrated embodiment, each fan is in fluid communication with one heat producing component and the fan speed function that is used by each fan is determined based on the cooling requirements of that heat producing component and the configuration of that heat producing component.

Figure 11:
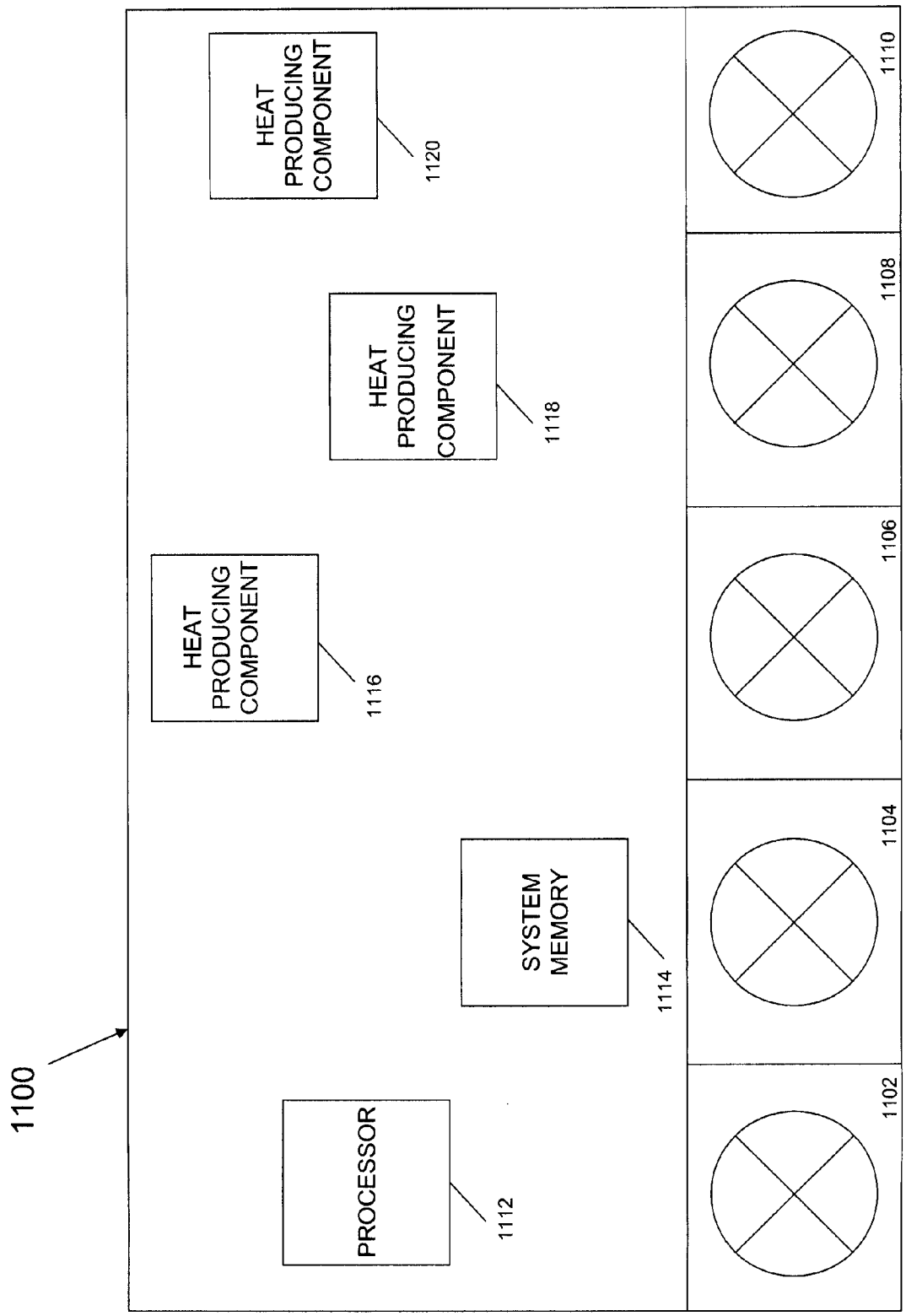
FIG. 11 is a schematic view illustrating an embodiment of an IHS comprising a chassis housing, a processor, a system memory, and a plurality of fans each in fluid communication with a plurality of heat producing components.

Referring now to FIG. 11, an embodiment of the IHS 1100 is illustrated. The IHS 1100 includes a plurality of fans 1102-1110, all in fluid communication with a processor 1112, a system memory 1114, and a plurality of heat producing components 1116-1120. In an embodiment, the method 500 may be used to determine nonlinear fan speed curves for each of the fans 1102-1110 in the IHS 1100 based on the cooling requirements of the components, and the method 600 may then be used to cool those components, as described above. In the illustrated embodiment, each fan 1102-1110 uses a respective nonlinear fan speed curve determined based on, for example, the fans position, the cooling requirements of the processor 1112, the system memory 1114, and the plurality of heat producing components 1116-1120, the configuration of the processor 1112, the system memory 1114, and the plurality of heat producing components 1116-1120, the ambient temperature, and/or a variety of other factors known in the art. In an embodiment, each fan receives a separate control signal, allowing each fan to operate at a different speed, if needed. In an embodiment, each of the fans 1102-1110 may receive the same control signal determined from a single fan speed curve which may be determined based on the cooling requirements of the processor 1112, the system memory 1114, and the plurality of heat producing components 1116-1120, the configuration of the processor 1112, the system memory 1114, and the plurality of heat producing components 1116-1120, the ambient temperature, and a variety of other factors known in the art.

Thus, systems and methods are provided that control fan speeds in an IHS in order to optimize the cooling of components in that IHS. Nonlinear fan speed curves may be determined for each configuration of an IHS in order to provide optimized fan speeds for the components in those configurations, and those nonlinear fan speed curves may be employed to determine the appropriate fan speed to cool the components. In an embodiment, a given IHS may be tested by the IHS manufacturer in a plurality of its configurations to determine a plurality of fan speed curves that may be needed to optimally cool the IHS components. The IHS may then be manufactured according to a customers specifications, and the appropriate nonlinear fan speed curves may be used to cool that IHS based on a detected configuration. Such systems and methods provide a more efficient means for cooling an IHS, saving power, cutting down noise, and extending component and fan life.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fan speed control system, comprising:
a fan;
an information handling system (IHS) including a heat producing component that is in fluid communication with the fan and in a first tested configuration of the IHS of a plurality of tested configurations of the IHS, wherein each of the plurality of tested configurations of the IHS include the heat producing component being positioned in different locations in an IHS chassis to provide different cooling requirements; and
a fan speed control engine coupled to the fan and operable to control a speed of the fan by detecting the first tested configuration of the IHS from the plurality of tested configurations of the IHS, selecting a nonlinear fan speed function using the detected first tested configuration of the IHS, and inputting a detected temperature into the nonlinear fan speed function.

2. The system of claim 1, wherein the nonlinear fan speed function is selected from a plurality of nonlinear fan speed functions.

3. The system of claim 2, wherein the selected nonlinear fan speed function comprises the nonlinear fan speed function having the greatest fan speed for the detected temperature relative to the remainder of the plurality of nonlinear fan speed functions.

4. The system of claim 1, wherein the heat producing component is coupled to the fan speed control engine.

5. The system of claim 1, wherein at least two of the tested configurations of the IHS comprise the heat producing component in different modes.

6. A method for controlling fan speed, comprising:
providing an information handling system (IHS) having at least one heat producing component, a fan in fluid communication with the at least one heat producing component, and a fan speed control engine coupled to the fan and to the at least one heat producing component;
determining a plurality of different cooling requirements for a plurality of different tested IHS configurations by positioning the at least one heat producing component in different locations in an IHS chassis for each tested IHS configuration and determining a cooling requirement for that tested IHS configuration;
defining at least one nonlinear fan speed function using the cooling requirement of each tested IHS configuration; and
including the nonlinear fan speed function in the fan speed control engine, wherein the fan speed control engine is operable to select the nonlinear fan speed function using a detected tested IHS configuration and input a detected temperature of the at least one heat producing component into the nonlinear fan speed function to control a fan speed of the fan.

7. The method of claim 6, wherein at least two of the tested IHS configurations comprises the at least one heat producing component operating in different modes.

8. The method of claim 6, further comprising:
detecting a temperature; and
inputting the detected temperature into the nonlinear fan speed function to control the fan speed of the fan.

9. The method of claim 6, further comprising:
detecting a temperature;
selecting from among a plurality of nonlinear fan speed functions; and
inputting the detected temperature into the selected nonlinear fan speed function to control the fan speed of the fan.

10. The method of claim 9, wherein the selected nonlinear fan speed function comprises a fan speed function resulting in the greatest fan speed for the detected temperature relative to the remainder of the plurality of nonlinear fan speed functions.

11. A method of fan speed control, comprising:
providing a fan that is in fluid communication with at least one heat producing component that is positioned in an information handling system (IHS) chassis in a first tested configuration of a plurality of tested configurations of the IHS chassis, wherein each of the plurality of tested configurations of the IHS chassis include the at least one heat producing component being positioned in a different location in the IHS chassis to provide a different cooling requirement;
detecting the first tested configuration;
detecting a temperature;
determining a fan speed by using the detected first tested configuration to select a nonlinear fan speed function and inputting the detected temperature into the selected nonlinear fan speed function; and
applying a control signal to the fan such that the fan operates at the determined fan speed in order to cool the at least one heat producing component.

12. The method of claim 11, wherein the nonlinear fan speed function is selected from among a plurality of nonlinear fan speed functions.

13. The method of claim 12, wherein the selected nonlinear fan speed function comprises a fan speed function that results in the greatest fan speed for the detected temperature relative to the remainder of the plurality of nonlinear fan speed functions.

14. The method of claim 11, wherein the at least two of the tested configurations of the IHS chassis comprise the at least one heat producing component different modes.

15. The method of claim 11, wherein the determined fan speed is partially defined by a component feedback.

16. The method of claim 11, wherein the nonlinear fan speed function is of the form:

$$Ax^a + Bx^2 + Cx + D; \text{ and}$$

wherein A, B, C, and D are coefficients based at least partially on the detected first tested configuration, and x is the detected temperature.

17. The method of claim 11, wherein the detected temperature is used as a direct input to the nonlinear fan speed function in order to determine the fan speed.

18. The method of claim 11, wherein the providing the fan that is in fluid communication with at least one heat producing component that is positioned in the IHS chassis in the first tested configuration comprises providing a plurality of fans, each in fluid communication with a single heat producing component that is positioned in the IHS chassis in the first tested configuration, and wherein the method further comprises:
determining the fan speed for each of the plurality of fans using the detected first tested configuration to select a nonlinear fan speed function and inputting the detected temperature into the selected nonlinear fan speed function, wherein the nonlinear fan speed function was determined for the fan based on the cooling requirements of that fans single heat producing component in the first tested configuration; and applying a control signal to each of the plurality of fans such that each of the plurality of fans operates at the determined fan speeds in order to cool each heat producing component.

19. The method of claim 11, wherein the providing the fan that is in fluid communication with at least one heat producing component that is positioned in the IHS chassis in the first tested configuration comprises providing a plurality of fans, each in fluid communication with a plurality of heat producing components that are positioned in the IHS chassis in the first tested configuration, and wherein the method further comprises:

determining the fan speed for each of the plurality of fans using the detected first tested configuration to select a respective nonlinear fan speed function and inputting the detected temperature into the selected respective nonlinear fan speed functions, wherein the selected nonlinear fan speed functions were determined for the fans based on the cooling requirements of that fans plurality of heat producing components in the first tested configuration; and applying a control signal to each of the plurality of fans such that each of the plurality of fans operates at the determined fan speeds to cool the plurality of heat producing components.

20. The method of claim 19, wherein at least two of the tested configurations of the IHS chassis comprise the plurality of heat producing components at different modes.

\* \* \* \* \*